March 20, 1951 R. T. SQUIER ET AL 2,545,830
MAGNETIC COMPASS
Filed March 29, 1947

Inventors
RALPH T. SQUIER
LESLIE E. DEWEY

George H. Fisher
Attorney

Patented Mar. 20, 1951

2,545,830

UNITED STATES PATENT OFFICE 2,545,830

MAGNETIC COMPASS

Ralph T. Squier and Leslie E. Dewey, Minneapolis, Minn., assignors to Minneapolis-Honeywell Regulator Company, Minneapolis, Minn., a corporation of Delaware Application March 29, 1947, Serial No. 738,170

10 Claims. (Cl. 201—48)

The present invention relates to navigational instruments, and more particularly to improvements in magnetic compasses. Though the use of instruments embodying control devices of a variable resistance type in conjunction with a sensing element is old in the art, the torque required to actuate such a control device greatly decreases the sensitivity and accuracy of such a system. It is therefore an object of this invention to provide an improved magnetic compass which includes a variable resistance type control device so arranged that response of the sensing element of the compass operates the control device to supply a signal to an external or remote instrument.

It is also an object to so associate a sensing element with an improved potentiometer arrangement that a greatly reduced torque is required to move the potentiometer wiper along the potentiometer winding.

A further object of this invention is to provide an arrangement in such a magnetic compass whereby the operation of the control device is unaffected by any tilt or dip of the sensing element of the magnetic compass.

It is an additional object to provide an improved pivot structure for devices of the present sort.

It is also an object to provide an improved arrangement of a control device, such as a potentiometer, with a pivot structure permitting universal movement.

It is another object to provide an improved arrangement of a float type sensing element and a pivot means for the same which prevents vertical movement of the float means sufficient to affect the operation of the control device incorporated with it.

Various other objects, advantages and features of novelty which characterize our invention will become apparent upon a study of the following specification and drawings wherein.

Figure 2:
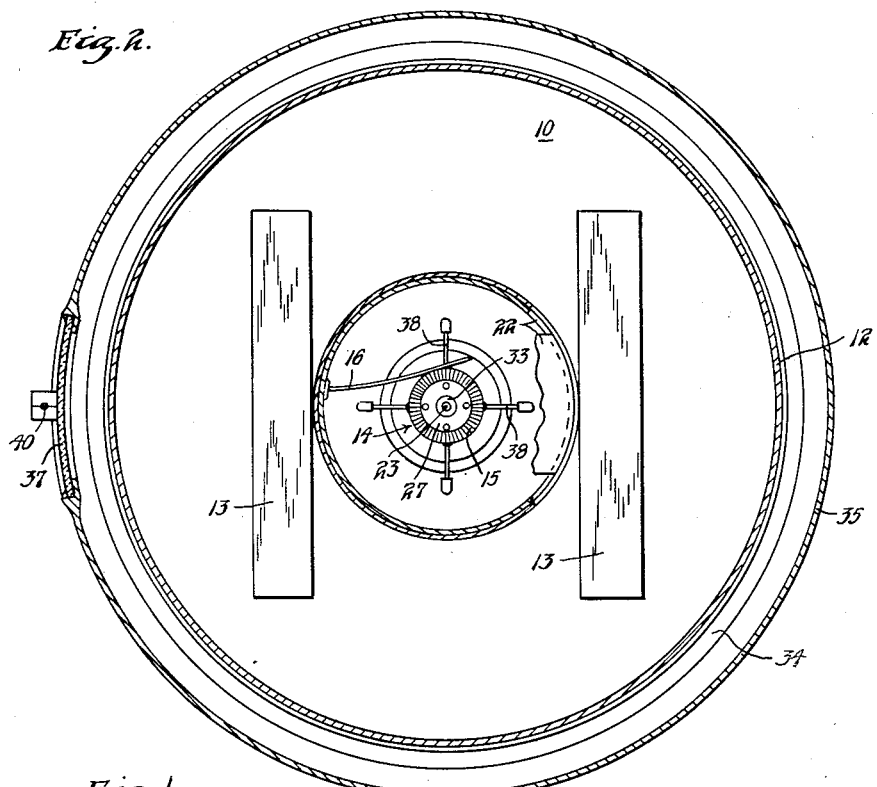
Figure 2 shows a horizontal section of the compass shown in Figure 1, taken along the line 2—2 of Figure 1.

Referring to the drawings, compass 10 is seen to comprise a fluid tight casing 11, a support structure 14 and a float assembly 12 pivotally mounted on said support structure 14. The float assembly 12 includes the sensing elements 13 of the compass 10.

Float assembly 12 comprises a hollow annular metal float 20 and an inverted cup-like pivot attachment means 22 having a portion extending across the center opening of said float 12. Float 20 and attachment means 22 are preferably constructed of a non-magnetic material such as brass. A pair of bar magnets 13, preferably of Alnico V type (an aluminum-nickel alloy), are arranged within the inner bottom portion of the float 20, the bars being parallel and having their North or like polarity ends extending in the same direction. The Alnico V magnetic material was chosen for the magnets because of its high magnetic energy per unit volume of material, but obviously any other suitable material may be used.

As best seen in Figure 2, the bars are separated by the central opening of the float. It has been found, for the present compass, that the maximum torque consistent with a minimum period of oscillation is obtained by using two one-half inch square bar magnets each three inches long spaced two and one-half inches apart. A greater separation of the magnets would result in reducing the torque and in an increased period of oscillation. The bars are placed at the bottom of the float 20 to lower the center of gravity, thus increasing the inherent stability of the float assembly 12. A centrally located pivot pin 23 is secured to the portion of the inverted cup-like attachment means 22 which extends across the central opening of the annular float. This pivot pin 23 is located high enough so that the pivot point is above the center of gravity but reasonably close to the center of volume of float assembly 12. Pivot pin 23 includes a flange 24 which preferably has a curved upper surface, the said flange being used for a purpose which will be apparent.

A resilient potentiometer wiper 16 is also attached to the cup-like attachment means 22 and extends generally horizontally. Wiper 16 is preferably arranged in approximately a horizontal plane with the extremity of the pivot pin 23 and is adapted to coact with an annular resistor 15, to be described. An index or scale 21 is positioned on the lower portion of the outer surface of the hollow annular metal float 20 and is scaled or inscribed to correspond with the position of the magnets.

The support structure 14 on which float assembly 12 is pivotally mounted comprises a pedestal portion 25, of a non-magnetic metal such as brass, suitably attached, as by brass screws, to the base 34 of the fluid tight casing means 11. The upper portion of the pedestal 25 includes an attaching flange and a centrally located cylindrical bore 30. Mounted on top of the pedestal 25 and attached to the flange thereof is an annular cup-like member 26, formed of insulating material, and having a bottom attaching flange, an inner relatively large cylindrical bore 28 and a smaller concentric bore 29 aligning with the bore 30 of the pedestal. A contact block 31 of a non-magnetic material, such as stainless steel, is constructed and arranged so that an upper cylindrical portion is slidable in the large bore 28 of the cup-like member 26 and a lower cylindrical portion slidably extends through the smaller bore 29 of the cup-like member 26 and into the bore 30 of the pedestal where it is supported by a spring 32 of non-magnetic metal. The characteristics of this spring will be later described. A recessed socket portion is arranged in the top of this contact block 31 and forms a bearing for the pivot pin 23 of the float assembly 12, as will be noted. A retainer 27, having an opening 33 through which the pivot pin 23 extends, is attached to the upper portion of the annular cup-like member 26 and cooperates with the flange 24 on the pivot pin 23 to limit the upward movement of the float assembly 12 and to insure that pivot pin 23 does not disengage the contact block 31. Further, the opening 33 in the retainer is of such size that pivot pin 23 normally does not contact said retainer 27.

Figure 1:
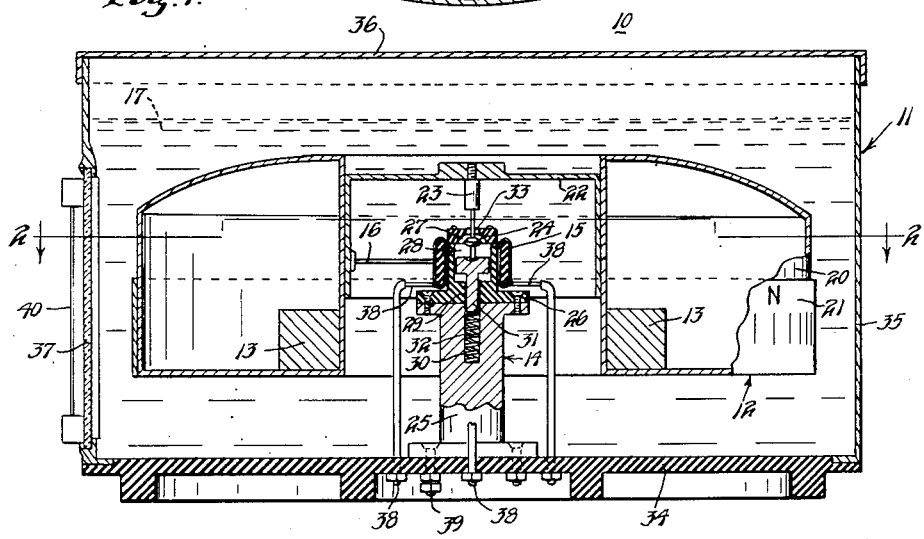
Figure 1 shows a vertical section taken through the axis of a compass comprising a preferred embodiment of our invention.

An annular potentiometer resistor 15 having an appreciable vertical dimension is arranged around the outer part of the cup-like member 26 concentric with the pivot pin 23, it being noted that the pivot point 23 of the float assembly 12 is normally substantially at the center of said resistor 15. Connections may be made with said resistor in any suitable fashion, such as by leads 38, said leads being sealed in the base 34 of the fluid tight casing 11, as shown in Figure 1. Potentiometer resistor 15, since it is mounted on the cup-like member 26 which is made of an insulating material, is insulated from the rest of the pivot support 14. The wiper 16, previously noted as resilient, extends tangentially off resistor 15 and is biased into sliding contact therewith. Since the wiper 16 extends horizontally from the cup-like attachment means 22 and lies in substantially the same plane as the pivot point, it will normally engage at or near the center of the vertical dimension of the resistor 15. The vertical dimension of resistor 15 is made greater than any possible vertical range of movement of the wiper 16 which might be caused by rise, fall or tilt of float means 12 so that wiper 16 will always engage resistor 15.

With the parts of compass 10 arranged as above described, an electrical circuit can be traced from an attaching screw 39 through pedestal 25, spring 32, contact block 31, pivot pin 23, cup-like means 22, wiper 16, resistor 15 and leads 38. As shown, screws 39 and leads 38 are insulated from each other by the insulating material of which base 34 is constructed. Obviously, if desired, resistor 15 can be energized from an external source by suitable connections with leads 38.

As thus far described, float assembly 12 is pivotally mounted on support structure 14 by pivot pin 23 which bears on the contact block 31. This block is biased upwardly by spring 32 which is located in bore 30 of pedestal 25. To lessen the weight on the block 31 and thus lessen the friction, and also to dampen movement of said float assembly 12, the housing or fluid tight casing 11 is filled with a suitable liquid, such as kerosene, above the top of the float assembly 12. The weight and volume of the float assembly 12 is so arranged that it does not actually float but rather exerts a small resultant force, or net weight, on the contact block 31 through pivot pin 23, a net weight of about forty grams being found satisfactory. As the float assembly 12 rises or falls due to changes in buoyancy, shock, or the like, this effective force applied to the spring 32 through the contact block 31 may vary but the spring pressure is always sufficient to maintain contact between the pivot pin 23 and contact block 31 and to restore block 31 to its normal position. The fluid tight casing or housing 11, since it contains a liquid, is designed to prevent leakage and to be sufficently rigid to resist any ordinary mechanical shocks which are applied to it. A viewing window 37 and sight line 40 are provided in the wall 35 of said casing for visual observation. Cover 36 of casing 11 may be made removable to permit inspection and maintenance of the float assembly, support structure and the like.

In operation, the float 20, due to the magnets 13, seeks magnetic North and the wiper 16 is adjusted accordingly around the potentiometer resistor 15. Due to the present improved design, a sensitivity of response within one degree has been found readily obtainable. This sensitivity is due, at least in part, to the reduction in torque required to move the float 20 since the frictional resistance between the parts of the control device is greatly reduced. Under moderate tipping of the casing 11 and support structure 14 this sensitivity is unimpaired. If the tipping occurs on an axis substantially at right angles to the potentiometer wiper 16, only a slight rotative movement of the wiper 16 with respect to the resistor 15 at the point of engagement takes place. Should the tipping take place on an axis in substantial alignment with the wiper 16, a slight vertical movement of the wiper 16 takes place. In neither case is there any appreciable change in the effective adjustment of the potentiometer.

For a disclosure of a remote indicating system utilizing the present compass, reference is made to the patent to Waldo Kliever, No. 2,454,184, issued November 16, 1948.

In considering this invention, it should be kept in mind that the present disclosure is intended to be illustrative only and that the scope of the invention is to be determined only by the appended claims.

We claim:

1. In a magnetic compass, float means, a container enclosing said float means and having a liquid fill adapted to buoy up said float means within said container, said container including a pedestal and a contact block slidably mounted therein, a pivot pin secured to said float means and adapted to engage said contact block to pivotally mount said float means, and control means including an annular resistor and a resilient wiper, said resistor being mounted on said pedestal concentric with and within said float means, said wiper being mounted on said float means and tangentially engaging said resistor, said wiper being so positioned on said float means and said resistor on said pedestal that the point of engagement of said wiper with said resistor is in substantially the same horizontal plane as the point of engagement of said pivot pin with said contact block.

2. In a magnetic compass, float means, a container enclosing said float means and having a liquid fill adapted to buoy up said float means within said container, said container including a pedestal and a contact block slidably mounted therein, a pivot pin secured to said float means and adapted to engage said contact block to pivotally mount said float means on said pedestal, spring means located in said pedestal and adapted to engage said contact block and urge said block into engagement with said pivot pin, and control means including an annular resistor and a resilient wiper, said resistor being mounted on said pedestal concentric with and within said float means, said wiper being mounted on said float means and tangentially engaging said resistor, said wiper being so positioned on said float means and said resistor on said pedestal that the point of engagement of said wiper with said resistor is in substantially the same horizontal plane as the point of engagement of said pivot pin with said contact block.

3. In a magnetic compass, float means, a container enclosing said float means and having a liquid fill adapted to buoy up said float within said container, said container including a pedestal and a contact block slidably mounted therein, a pivot pin secured to said float means and adapted to engage said contact block to pivotally mount said float means on said pedestal, and control means including an annular resistor and a resilient wiper, said resistor being mounted on said pedestal and insulated therefrom being concentric with said float means, said wiper being mounted on said float means and tangentially engaging said resistor, said float means, said pivot pin and said contact block being made of an electrically conductive material such that an electrical circuit is made from said wiper to said pedestal independent of said resistor, said wiper being so positioned on said float means and said resistor on said pedestal that the point of engagement of said wiper with said resistor is in substantially the same horizontal plane as the point of engagement of said pivot pin with said contact block.

4. In a compass, float means including means responsive to the earth's magnetic field, a container enclosing said float means and containing a liquid adapted to buoy said float means, means secured to said container and pivotally mounting said float means for rotation within said container as said responsive means varies in relation to the earth's magnetic field, variable impedance means comprising relatively movable elements, means for positioning one of said elements on said pivotal mounting means, and means for carrying the other of said relatively movable elements on said float means for rotation therewith, said elements of said variable impedance means being located in the same horizontal plane with said pivotally mounting of said float means.

5. In a device of the class described, in combination, pivot means, float means including magnetic field responsive means mounted on said pivot means and rotatably positioned in response to relative displacement of a magnetic field and said responsive means, a container enclosing said float means and containing a liquid adapted to buoy said float means, variable impedance means comprising relatively movable elements, means for positioning one of said elements on said pivot means concentric with said float means and in the same plane with said pivotal mounting, and means for positioning another of said relatively movable elements on said float means, said second named element being positioned to make a sliding contact with said first named variable impedance element in all positions assumed by said float means.

6. In a device of the class described, in combination, pivot means, magnetic field responsive means mounted on said pivot means at a single point for rotational and tilting movement and rotatably positioned in response to relative displacement of a magnetic field and said responsive means, variable impedance means comprising relatively movable elements, means for positioning one of said elements on said pivot means and insulated therefrom, and means for positioning another of said relatively movable elements on said responsive means, said responsive means and said pivot means being made of an electrically conductive material to provide an electrical circuit from said second named element to said pivot means independent of said first named element, said second named element being positioned to make a sliding contact with said first named variable impedance element in all positions assumed by said responsive means.

7. In a device of the class described, in combination, a container at least partially filled with a liquid, pivot means attached to the inner portion of the base of said container, float means including magnetic field responsive means mounted on said pivot means within said container to be buoyed by said liquid and rotatably positioned in response to relative displacement of a magnetic field and said responsive means, potentiometer means including a resistor with tapped connections and a wiper means, said resistor being mounted on said pivot means concentric therewith and in the same plane with said pivotal mounting, and said wiper means being mounted on said float means and biased into sliding contact with said resistor for all positions of tilt of said float means and during rise and fall of said float means, and means for connecting said potentiometer means to an external system.

8. In a device of the class described, in combination, a container at least partially filled with a liquid, pivot means attached to the inner portion of the base of said container, float means including magnetic field responsive means mounted on said pivot means within said container to be buoyed by said liquid and rotatably positioned in response to relative displacement of a magnetic field and said responsive means, potentiometer means including a resistor with tapped connections and a wiper means, said resistor being mounted on said pivot means and insulated therefrom, said wiper means being mounted on said float means and biased into sliding tangential contact with said resistor in all positions of tilt of said float means, said float means and said pivot means being made of an electrically conductive material to provide an electrical circuit from said wiper to said pivot means independent of said resistor, and means for connecting said potentiometer means to an external system.

9. In a compass, a support, a movable compass element including a permanent magnet, cooperating pivot members of electrically conducting material on said compass element and on said support, one of said members presenting a convex surface that cooperates with a concave surface on the other of said members to form a substantially frictionless universal pivotal support for said compass element, cooperating impedance varying means mounted on said support and on said compass element, and an electrical connection including said pivot members to said impedance varying means which is mounted on said compass element.

10. In a compass, a support, a compass element including a permanent magnet movable about a vertical axis, a pivot member of electrically conducting material vertically movable in said support and spring biased upwardly, a pivot member of electrically conducting material on said compass element, one of said members presenting a convex surface cooperating with a concave surface on the other of said members to form a substantially frictionless universal pivotal support for said compass element, a resistance element carried by said support and presenting a substantially cylindrical vertical conducting surface, a spring biased wiper carried by said compass element and engaging said conducting surface, and an electrical connection including said pivot members to said wiper.

RALPH T. SQUIER.
LESLIE E. DEWEY.

REFERENCES CITED

The following references are of record in the file of this patent:

UNITED STATES PATENTS

| Number | Name | Date |
| --- | --- | --- |
| 1,679,764 | Colvin | Aug. 7, 1928 |
| 2,008,481 | Weber et al. | July 16, 1935 |
| 2,087,086 | De Beeson | July 13, 1937 |
| 2,178,306 | Lauck | Oct. 31, 1939 |
| 2,202,154 | Kollsman | May 28, 1940 |
| 2,220,055 | Fischel et al. | Oct. 29, 1940 |
| 2,437,132 | Sinks | Nov. 17, 1943 |

FOREIGN PATENTS

| Number | Country | Date |
| --- | --- | --- |
| 211,187 | Great Britain | Feb. 18, 1924 |